E. G. LOOMIS.
UNIVERSAL PIPE JOINT.
APPLICATION FILED OCT. 11, 1918.
1,373,515.
Patented Apr. 5, 1921.
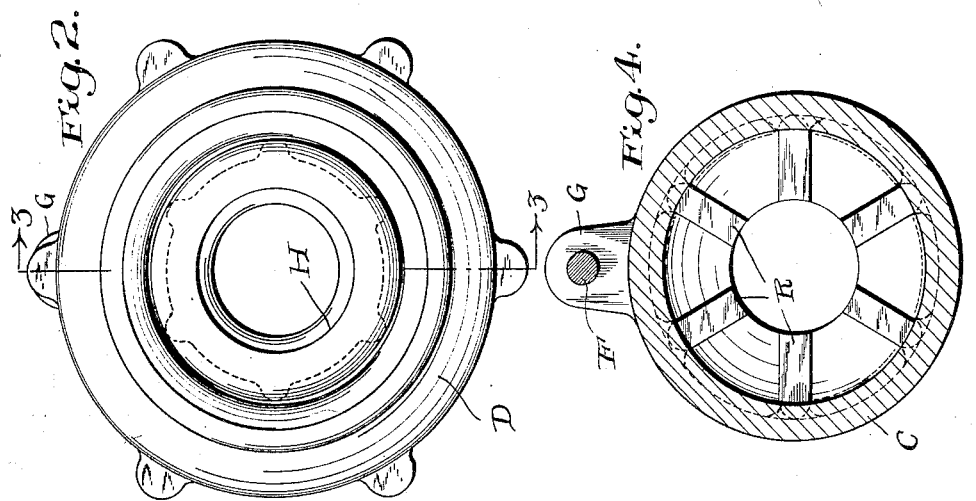
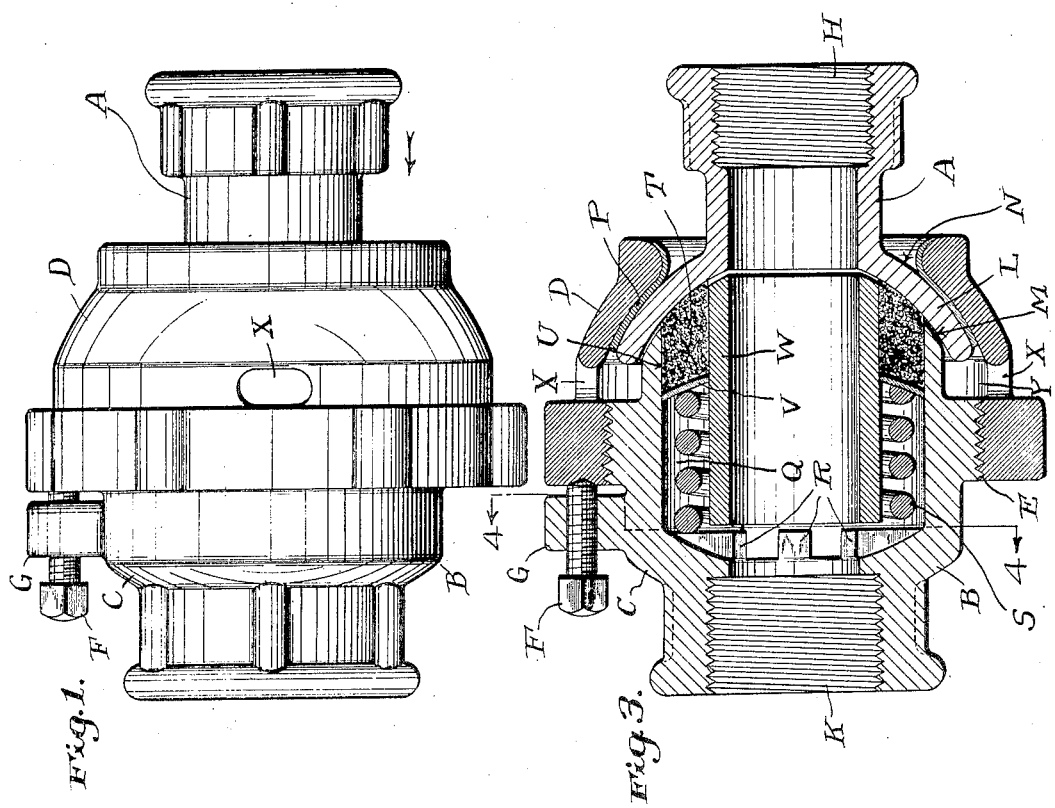
INVENTOR
Everts G. Loomis
BY
Kiddle Morgan
HIS ATTORNEYS.

UNITED STATES PATENT OFFICE.

EVARTS G. LOOMIS, OF NEWARK, NEW JERSEY.

UNIVERSAL PIPE-JOINT.

1,373,515.  Specification of Letters Patent.  Patented Apr. 5, 1921.

Application filed October 11, 1918. Serial No. 257,701.

*To all whom it may concern:*

Be it known that I, EVARTS G. LOOMIS, a citizen of the United States, and resident of Newark, county of Essex, and State of New Jersey, have invented certain new and useful Improvements in Universal Pipe-Joints, of which the following is a specification.

The invention is directed to a universal pipe joint and an object of the invention is to construct such joint so that it will remain tight even under hard and continued use.

Another object of the invention is to make a joint which will be comparatively cheap to manufacture, which can be readily assembled and disassembled, and which will require a minimum amount of attention to be maintained tight.

The joint which is the basis of the present invention relies in a large part for its effectiveness upon the manner in which the packing is constantly forced into firm engagement with a spherical portion, regardless as to whether the joint is hot or cold, or as to whether the pressure within the joint is small or great.

According to the present invention a swinging, tubular, casing member of the joint is provided with an annular flange which has concentric inner and outer spherical surface portions, and in the specific form of invention as herein described the outer spherical surface portion engages a seat and is forced into engagement with its seat by a spring-pressed packing which forcibly engages both the companion casing member and the inner spherical surface portion of said flange. As illustrating the specific manner in which the invention may be realized reference is made to the accompanying drawing forming a part of this specification, in which drawing, Figure 1 is an exterior view of the complete pipe joint.

Fig. 2 is an end view of the pipe joint and is a view looking in the direction of the arrow in Fig. 1.

Fig. 3 is a longitudinal sectional view through the pipe joint and is a view taken as on the plane indicated by the line 3—3 of Fig. 2, looking in the direction of the arrows.

Fig. 4 is a sectional view taken as on the planes indicated by the broken line 4—4 of Fig. 3, looking in the direction of the arrows.

The pipe joint shown may be considered to comprise a swinging, tubular, casing member A and a main casing B formed of two sections one of which sections is herein referred to as a tubular recessed section C and the other of which sections is herein referred to as a holding section D that is detachably secured at E by means of screw-threads to the recessed section C. The holding section D may be locked in place by means of a locking screw F which is threaded into a lug G on the recessed section C. The swinging, tubular, casing member A and the tubular recessed section C of the main casing are each provided at their respective outer ends with suitable means whereby each member can be connected to or have connected to it a pipe. The means shown in the drawings are the screw-threaded portions H and K. Any other suitable connecting means could be employed, if desired. The swinging, tubular casing member A is provided with an annular flange L. This annular flange L has concentric inner and outer spherical surface portions, as M and N; the center of these surface portions is located at O. The outer spherical surface portion N is seated against a brass or liner P which is provided upon or carried by the holding section D. This brass or liner P may be considered in effect a part of the holding section D, or as a seat against which the flange presses and relative to which the flange slides. The casing member A is preferably made of cast brass and I have found that a liner P of sheet pressed rolled brass provides a good combination of materials to resist wear. The section C has above been referred to as a recessed member because of the recess Q provided therein. At the bottom of the recess there is provided a series of spaced radial members as R collectively constituting a seat, against which there rests the rear end of a strong compression spring S located within the recess. A packing T—preferably a packing of a special form—is located in the recess so that the forward end of the packing is in engagement with the inner spherical surface portion M of the annular flange L. The packing T fits the inner surface U that defines the recess and at the rear end of the packing there is located a washer V which functions so as to force the rear portion of the washer outwardly against the surface U to maintain a tight joint between the washer on the one hand and the walls defining the recess of the recessed section C on the other.

The forward end of the spring S presses against the rear face of the washer so that it will thus function and so as to supply the force necessary to maintain the joint tight at the forward end of the washer; the pressure of the spring forces the packing forwardly into firm engagement with the inner spherical surface portion M of the flange L. The packing T surrounds a member W which may be referred to as an inner tubular member. This inner tubular member W serves to maintain the proper shape and form of the inner contour of the packing T when the pipe joint is in use; or in other words the inner tubular member W serves to prevent the packing from collapsing.

From an inspection of Fig. 3 it will be readily seen that under all conditions the packing T is forced into firm engagement with both the tubular recessed section C and the flange L of the swinging, tubular, casing member A whereby a tight joint will be maintained.

Openings are provided at X in the holding section D so as to permit the escape of any liquids which may possibly leak or collect in the space Y. The pipe joint herein described is designed for use to a large extent in cold climates, for example in pipe for supplying locomotive tenders with water and in many other exposed places and it is therefore advisable to eliminate or avoid any pockets wherein water could collect and freeze.

The pipe joint which is the subject of the present invention is a universal or swinging pipe joint and is adapted for general use, and it will be manifest that the invention can be embodied in various forms without departing from the spirit and scope thereof.

What I claim is:—

1. A universal pipe joint having a swinging, tubular, casing member provided with an annular flange which flange has concentric inner and outer spherical surface portions, and a coöperating main casing which has a tubular recessed section and which is provided with a removable holding section detachably connected to the tubular recessed section, there being in said recessed section of the main casing a packing, a following washer and a compression spring the latter of which is seated in the recessed section so that it presses the washer in a manner to force the packing into engagement with the inner spherical surface portion of the annular flange, the removable holding section being constructed so that when in place it engages the outer spherical surface portion of the annular flange.

2. In a universal pipe joint a swinging, tubular, casing member provided with an annular flange the outer surface of which flange is spherical and the inner surface of which flange is spherical, and a main casing composed of a plurality of members detachably connected together and constructed so that the swinging, tubular, casing member can swing relative to the main casing when the parts of the pipe joint are assembled, one of the members of the main casing being constructed so that it fits and has a sliding engagement with the exterior of the annular flange, the other member of the main casing being recessed and having therein an inner tubular member, a packing within the recess which packing surrounds said inner tubular member and the forward end of which packing is arranged to engage the inner spherical surface portion, a washer located at the rear of the packing and shaped so as to press the packing against the walls defining the recess within which the packing is located, and a compression spring which surrounds the inner tubular member and arranged so that the forward end engages the rear side of the washer and so that the rear end rests upon the main casing member.

3. A universal pipe joint having a swinging, tubular, casing member which is provided at the inner end thereof with an annular flange that has concentric inner and outer spherical surface portions, a main casing comprising a tubular recessed section and a holding section detachably secured to the recessed section, a sheet metal brass or liner on the holding section which brass or liner is in engagement with the outer spherical surface portion of the flange so as to provide a seat for the latter, an inner tubular member or portion located within the recess of the recessed section, a packing surrounding said inner tubular member the forward end of which packing engages and fits the inner spherical surface portion of the flange, a washer located at the rear of the packing in the recessed section which washer surrounds said inner tubular member, the recessed section being provided with a seat upon which the rear end of the compression spring is seated, the forward end of the compression spring being in engagement with the washer so as to force the packing forwardly against the flange.

4. A universal pipe joint having a swinging, tubular, casing member which is provided at the inner end thereof with an annular flange that has concentric inner and outer spherical surface portions, a main casing comprising a tubular recessed section and a holding section detachably secured to the recessed section, a sheet metal brass or liner on the holding section which brass or liner is in engagement with the outer spherical surface portion of the flange so as to provide a seat for the latter, an inner tubular member or portion located within the recess of the recessed section, a packing surrounding said inner tubular member the forward end of which packing engages and fits the inner spherical surface portion of the flange, a washer located at the rear of the packing in the recessed section which washer surrounds said inner tubular member, the recessed section being provided with a seat upon which the rear end of the compression spring is seated, the forward end of the compression spring being in engagement with the washer so as to force the packing forwardly against the flange, the washer being shaped so that it forces the rear portion of the packing outwardly against the recessed section of the main casing in a manner to make a tight joint between said recessed section on the one hand, the packing, washer and the swinging tubular casing member on the other.

5. A universal pipe joint comprising in combination a swinging, tubular, casing member having a flange with concentric inner and outer spherical surface portions, a main casing comprising a tubular recessed section and a holding section that surrounds the recessed section and that is engaged by the outer spherical surface portion of the flange, a packing located in the recess of the recessed section, a washer, and means for forcing the washer against the recessed section and against the inner spherical surface portion of the flange, there being in the holding section openings leading from the space which is defined by the outer edge of the flange, the recessed section and the holding section.

This specification signed this 10th day of October, A. D. 1918.

EVARTS G. LOOMIS.